United States Patent [19]

Alexandres et al.

[11] Patent Number: 5,521,021
[45] Date of Patent: May 28, 1996

[54] ELECTRIC VEHICLE CELL

[75] Inventors: Richard B. Alexandres, Clear Lake, Iowa; Elmer Hughett, Oneida, Tenn.

[73] Assignee: Alexander Manufacturing Corporation, Mason City, Iowa

[21] Appl. No.: 271,415

[22] Filed: Jul. 6, 1994

[51] Int. Cl.[6] .............................. H01M 2/12; H01M 6/10
[52] U.S. Cl. ................... 429/54; 429/72; 429/94; 429/174
[58] Field of Search ..................... 429/53–56, 94, 429/72, 168–174, 223, 194, 213

[56] References Cited

U.S. PATENT DOCUMENTS

| | | |
|---|---|---|
| 1,015,735 | 1/1912 | Heuser . |
| 1,636,328 | 7/1927 | Sauer . |
| 1,796,855 | 3/1931 | Ahlers . |
| 3,015,758 | 1/1962 | Hildebrandt et al. . |
| 3,956,677 | 5/1976 | Quick . |
| 4,091,181 | 5/1978 | Merritt, Jr. ................. 429/94 |
| 4,259,416 | 3/1981 | Ikeda et al. . |
| 4,476,202 | 10/1984 | Wesner ...................... 429/94 |
| 4,788,112 | 11/1988 | Kung . |
| 5,043,235 | 8/1991 | Seefeldt et al. . |
| 5,079,108 | 1/1992 | Annen et al. ............... 429/171 |
| 5,171,647 | 12/1992 | Dean et al. ................. 429/54 |

*Primary Examiner*—Anthony Skapars
*Attorney, Agent, or Firm*—Kenyon & Kenyon

[57] ABSTRACT

An electric vehicle cell featuring internal pressure relief and spring disengagement devices which vent various internal pressures to atmosphere to prevent cell bulging or explosion and which also internally interrupt current flow through the cell due to internal overheat, excessive current draw and the like. Internal reconnection of cell members reoccurs subsequent to internal thermal and other abnormalities.

19 Claims, 3 Drawing Sheets

ELECTRIC VEHICLE CELL

BACKGROUND OF THE INVENTION

1. Field of the Invention

The present invention pertains to an electric vehicle cell, and more particularly, relates to a cell for use in an electric vehicle having internal safeguards such as automatic internal cell disengagement and re-engagement and internal cell pressure relief.

2. Description of the Prior Art

The prior art cell devices have included tabs from the electrodes leading to and welded to the positive and negative end plates. When a cell would experience dramatic operating conditions such as overheating, overcurrent and other abnormal operating conditions, the internal connections would often be displaced to the point of rendering the battery inoperative during these abnormal excursions due to internal member breakage and the inability to accommodate internal movement of components. Clearly what is needed is a cell which is forgiving of the design flaws of prior art cells and which can accommodate such internal movement and fluctuations without rendering the cell totally useless.

The present invention provides such a cell having internal pressure relief and automatic cell disabling and re-enabling capabilities.

SUMMARY OF THE INVENTION

The general purpose of the present invention is an electric vehicle cell. The cell can also be used for any other application, such as communications equipment.

According to one embodiment of the present invention, there is provided an electric vehicle cell assembly having a central electrode aligned within a case member including members which align to the top and to the bottom regions of the central electrode and within or adjoining the battery case. Aligned above the electrode assembly are a positive current collector, a spring, a positive end plate, a gasket/seal ring, a vent pellet, a positive contact member and an upper closing ring. Aligned below the electrode assembly are a negative current collector, a negative current end plate, a gasket/seal ring, a negative contact and a closing ring. The spring member in the upper portion of the cell exerts pressure downwardly upon the positive current collector to engage the positive electrodes of the cell. Expansion of internal members of the cell overcomes spring tension to cause disengagement of the positive current collector with the positive electrodes. Contraction of the internal members allows re-engagement by spring force. Pressure relief is provided for by a vent valve located in the upper region of the cell. The positive and negative contact members are of compatible male/female configuration to allow stacking of cells.

One significant aspect and feature of the present invention is an internally relieved cell and can include an optimal pressure relief vent.

Another significant aspect and feature of the present invention is an internal current interrupter which disengages the positive electrode from a positive current collector during an event and re-engages subsequent to the event. The event can be excessive current flow.

Yet another significant aspect and feature of the present invention is a spring member forcing engagement or re-engagement of the positive electrode to a positive current collector. The positive and a negative current collector have v-projections for electrode contact. The positive current collector can move vertically within the battery case.

A further significant aspect and feature of the present invention is a cell having terminals which allow for building cell stacks.

Having thus described embodiments of the present invention, it is the principal object of the present invention to provide an electric vehicle battery cell with internal safeguard structures.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
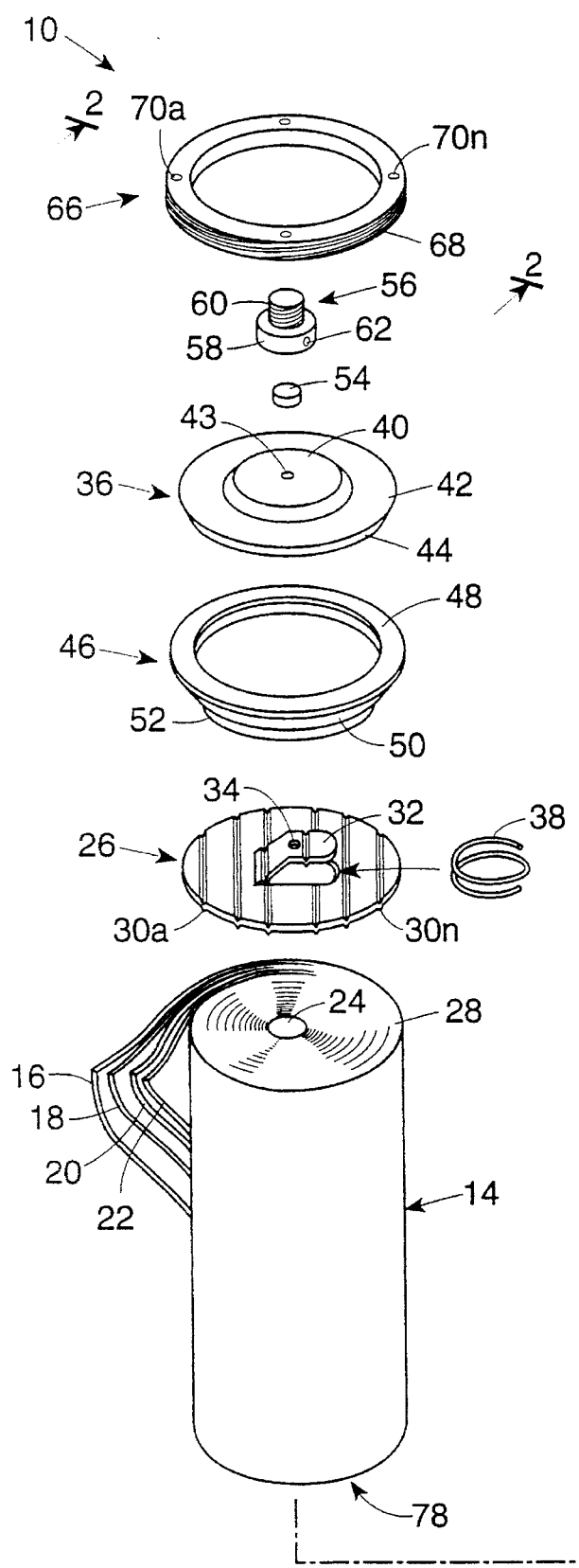
FIG. 1 is an exploded view of the electric vehicle cell.
Figure 1:
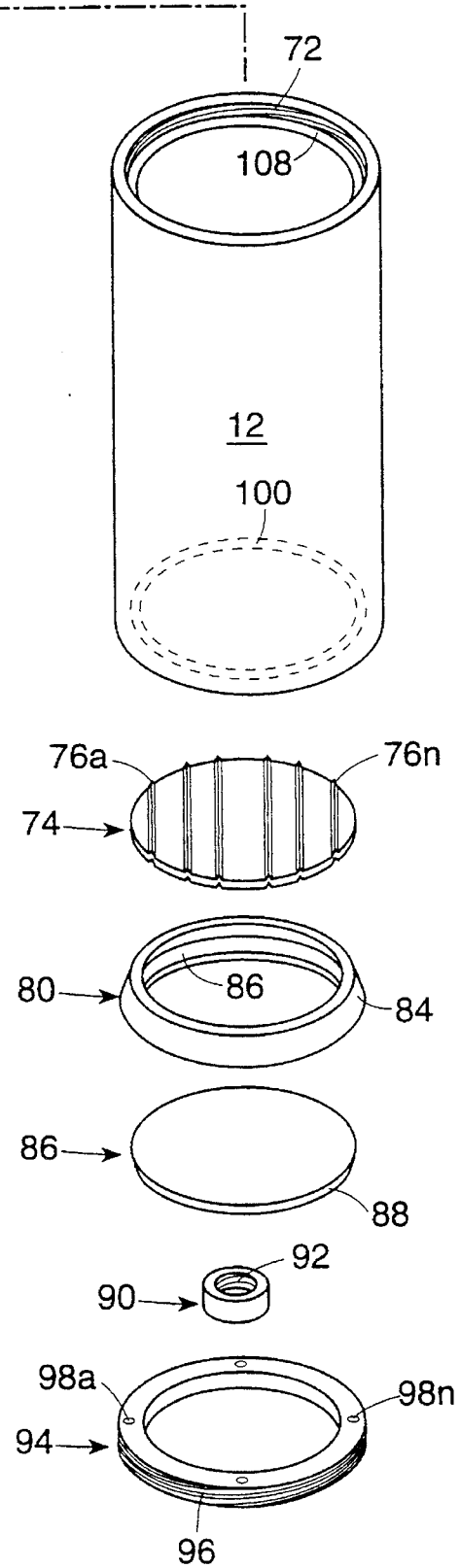
Figure 2:
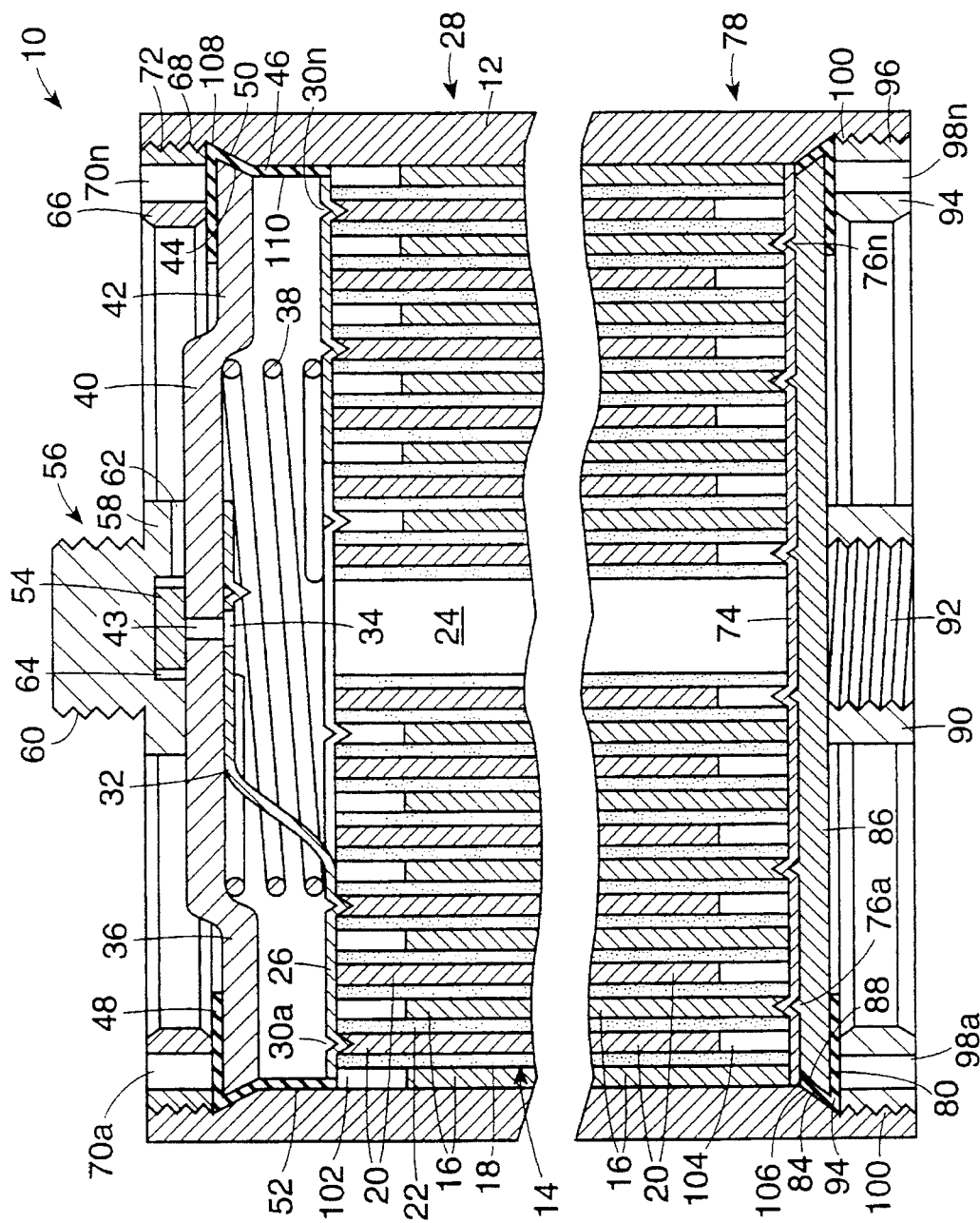
FIG. 2 is a foreshortened cross-sectional view of the cell along line 2—2 of FIG. 1; and, FIG. 3 is a view similar to FIG. 2, but showing the positive current collector disengaged from the positive electrode.

FIG. 1 illustrates an exploded view of an electric vehicle cell 10 featuring a plurality of component members which align in a casing member 12. Aligned centrally in the casing member 12 is a spirally wound electrode assembly 14 having a negative electrode 16, a first separator 18, a positive electrode 20 and a second separator 22 arranged as a layer and continuously layered over and about itself in spiral fashion in an ever increasing radius about a mandrel hole 24. A circular and substantially planar positive current collector 26 aligns in intimate contact to the upper surface 28 of the electrode assembly 14 to physically and electrically contact the positive electrode 20 at a plurality of contact areas as illustrated in FIG. 2. A plurality of downwardly extending v-projections 30a–30n contact the wound positive electrode 20 along and about the top edge of the upper surface 28. A spring tab 32 extends upwardly at an angle and then extends horizontally parallel to the plane of the positive current collector 26. An orifice 34 is also included in the horizontal portion of the spring tab 32. The spring tab 32 meets and secures to the bottom side of a positive end plate 36 as illustrated in FIG. 2. A spring 38 aligns over and about the spring tab 32 to effect intimate physical contact with the upper surface of the positive current collector 26 at the lower portion of the spring 38. The upper portion of the spring 38 intimately contacts and aligns in and is captured in a flat dome 40 of the positive end plate 36. Spring 38 forces the positive current collector 26 into physical and electrical contact with the positive electrode 20 in the spirally wound electrode assembly 14. The circular positive end plate 36 includes planar portion 42, a flat dome 40 extending upwardly from the planar portion 42, a vent 43 central to the flat dome, and a beveled edge 44. A gasket/seal ring 46 includes a washer-like top member 48, and a beveled side member 50 being a truncated cone. A cylindrical member 52 extends downwardly from the beveled member 50. The gasket/seal ring 46 aligns over and about the planar surface portion 42 and the beveled edge 44 of the positive end plate 36 and around and about the circumference of the positive current collector 26 as illustrated in FIG. 2. A vent pellet 54 aligns over and about the vent 43 at the flat dome 40. A threaded positive contact member 56 having a round disk base 58, threads 60 extending upwardly from the disk base 58, a vent hole 62 extending horizontally through the disk base 58 and a lower circular cavity 64, as illustrated in FIG. 2, aligns over and about the vent pellet 54 and bears against the flat dome 40 to form a relief valve in addition to being a positive connection point. An upper closing ring 66 having external circumferential threads 68 and a plurality of through holes 70a–70n aligns over and above the components illustrated therebelow to secure in threads 72 in the upper portion of the case 12 and to maintain the components in the interior of the casing 12.

A number of the components secure into the lower portion of the case 12 to effect a negative contact portion of the battery, including a negative current collector 74 having a plurality of upwardly extending v-projections 76a–76n for contact with the wound negative electrode 16 along and about the bottom edge of the electrode assembly lower surface 78, a negative current end plate 86 having a beveled edge 88, a gasket/seal ring 80 having, a bevel member 84 and a lower flat washer-like member 85, a cylindrical negative contact 90 having internal threads 92 secured to the underside of the negative current end plate 86 and a closing ring 94 similar to closing ring 66 having external circumferential threads 96 and a plurality of vertically extending through holes 98a–98n. The external circumferential threads 96 of the closing ring 94 engage internal threads 100 of the casing 12, as illustrated also in FIG. 2. The gasket/seal ring 80 aligns over and about the negative current end plate 86 and to the lower surface of the negative current collector 74 to effect a lower end seal.

The electric vehicle cell or battery cell can be nickel cadmium, nickel metal hydride, lithium ion, lithium polymer, or silver metal hydride with the appropriate electrolyte such as potassium hydroxide. Representative uses for the cell can include a vehicle battery in series, parallel or series-parallel.

FIG. 2 illustrates a foreshortened cross-sectional view of the cell 10 along line 2—2 of FIG. 1 where all numerals correspond to those elements previously described. Illustrated in particular is the overall connection between the pluralities of positive and negative electrodes 20 and 16 to the associated positive and negative members of the cell 10. It is noted that the lengths of the positive and negative electrodes 20 and 16 are not of the same length as the interspersed first and second separators 18 and 22 and that a space 102 of ever changing radius is provided over and above the top portion of the negative electrode 16. The positive electrode 20 extends upwardly beyond the height of the adjacent continued space 102 and between the upper regions of the first and second separators 18 and 22 where mutual physical and electrical contact with the v-projections 30a–30n of the positive current collector 26 is established. Contact of the v-projections 30a–30n of the positive current collector 26 with the negative electrode 16 is prevented in this region by the space 102 at the upper surface 28 of the electrode assembly 14. Spring tab 32 of the positive current collector 26 extends upwardly to align to and physically secure to and electrically connect to the underside of the flat dome 40 of the positive end plate 36. Spring 38 aligns over and about the tab 32 and between the underside of the flat dome 40 surface and the upper surface of the positive current collector 26 to exert downward pressure upon the positive current collector 26 to ensure contact of the v-projections 30a–30n with the positive electrode 20. Electrical flow proceeds through the positive current collector 26, the spring tab 32, positive end plate 36 and the positive connector member 56. Any excess pressure internal to the battery 10 is relieved and vented to atmosphere escaping through orifice 34 in the spring tab 32, vent 43, vent pellet 54, and vent hole 62 in the disk base 58. Other safety measures are described and illustrated in FIG. 3.

Connection to the negative electrode 16 is accomplished in the lower region of the cell 10. A space 104 is provided over and below the bottom position of the positive electrode 20 much in the same position as for space 102 at the upper portion of the battery 10. The negative electrode 16 extends downwardly beyond the uppermost region of the adjacent continual space 104 and between the lower regions of the first and second separators 18 and 22 where mutual physical and electrical contact with the v-projections 76a–76n of the negative current collector 74 is established. Contact of the v-projections 76a–76n with the positive current electrode 20 is prevented in this region by the continual space 104 at the lower surface 78 of the electrode assembly 14. The negative current collector 74 is in intimate physical contact and electrical contact with the negative current end plate 86. The cylindrical negative contact 90 secures to and is in direct physical and electrical contact with the negative current end plate 86. The lower end of the cell 10 is sealed by the compression of the gasket/seal ring 80 whereby the closing ring 94 is rotatingly advanced inwardly to cause the beveled edge 88 of the negative current end plate 86 to compress the bevel member 84 of the gasket/seal ring 80 between the bevel edge member 88 and a case bevel edge 106 adjacent to the screwthreads 100 in the casing 12. The upper end of the cell 10 is sealed in a somewhat similar fashion, the upper closing ring 66 is rotatingly advanced inwardly to cause the beveled edge 44 of the positive current end plate 36 to compress the bevel member 50 of the gasket/seal ring 46 between the bevel edge member 44 and a case bevel edge 108 adjacent to the screwthreads 72 in the casing 12. The circumference of the positive current collector 26 aligns within the radius 110 of the cylindrical member 52 of the gasket/seal ring 46 to accommodate vertical movement of the positive current collector 26 within the cylindrical member 52 of the gasket/seal ring 46 should such movement be caused by internal battery phenomenons such as thermal runaway, overcurrent, overload and other such interior anomalies.

MODE OF OPERATION

Figure 3:
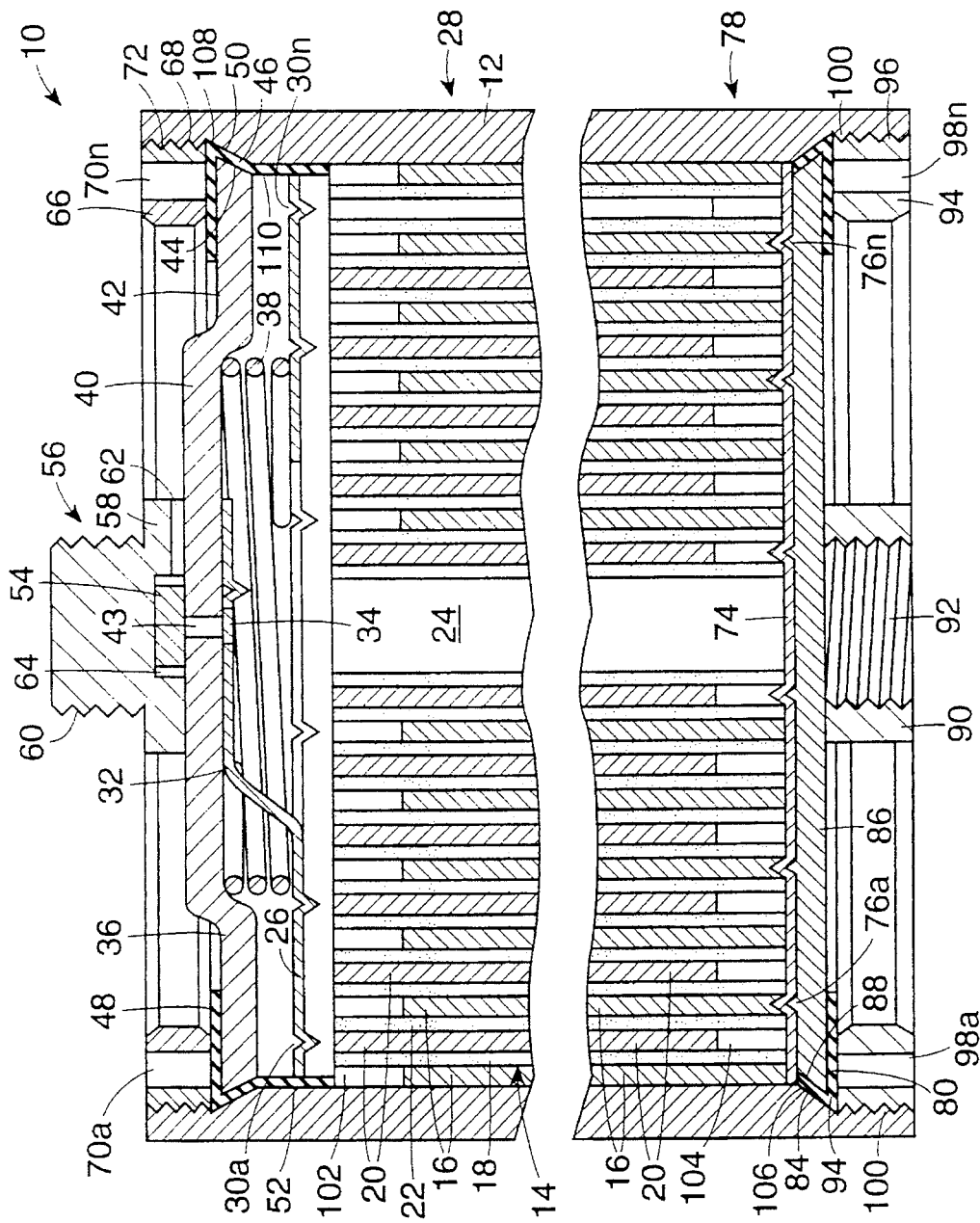

FIG. 3 illustrates the cell 10 of FIG. 2 where the positive current collector 26 has disengaged from the positive electrode 20 where all numerals correspond to those elements previously described. Internal pressures have caused the positive current collector 26 to move upwardly to physically and electrically disengage the positive electrode 20 from the positive current collector 26, thus interrupting current flow through the battery and acting as a circuit breaker or interrupter. Subsequent to battery cool-down or other undesirable occurrences and after reduction of internal pressures, the spring 38 repositions the positive current collector 26 for re-engagement with the positive electrode 20 so that battery operation may once again continue operation.

Various modifications can be made to the present invention without departing from the apparent scope hereof

| TITLE OF THE INVENTION PARTS LIST | |
|---|---|
| 10 | cell |
| 12 | casing |
| 14 | electrode assembly |
| 16 | negative electrode |
| 18 | first separator |
| 20 | positive electrode |

TITLE OF THE INVENTION
PARTS LIST

| | |
|---|---|
| 22 | second separator |
| 24 | mandrel hole |
| 26 | positive current collector |
| 28 | upper surface |
| 30a-n | projections |
| 32 | spring tab |
| 34 | orifice |
| 36 | positive end plate |
| 38 | spring |
| 40 | flat dome |
| 42 | vent |
| 44 | beveled edge |
| 46 | gasket/seal ring |
| 48 | washer-like top member |
| 50 | bevel member |
| 52 | cylindrical member |
| 54 | vent pellet |
| 56 | positive contact member |
| 58 | disk base |
| 60 | threads |
| 62 | vent hole |
| 64 | circuit cavity |
| 66 | upper closing ring |
| 68 | threads |
| 70a-n | holes |
| 72 | threads |
| 74 | negative current collector |
| 76a-n | projections |
| 78 | lower surface |
| 80 | gasket/seal ring |
| 84 | bevel member |
| 85 | lower flat washer-like member |
| 86 | negative current end plate |
| 88 | beveled edge |
| 90 | cylindrical negative contact |
| 92 | threads |
| 94 | closing ring |
| 96 | external threads |
| 98a-n | through holes |
| 100 | threads |
| 102 | space |
| 104 | space |
| 106 | bevel edge |
| 108 | bevel edge |
| 110 | inner radius |

We claim:

1. A battery cell comprising:
   a. a case;
   b. an electrode assembly comprising a positive electrode and a negative electrode disposed within said case;
   c. a positive current collector within said case in firm engagement with said positive electrode;
   d. a negative current collector within said case in firm engagement with said negative electrode;
   e. a positive end plate within said case spaced from said positive current collector;
   f. a flexible electrical conductor member connecting said positive current collector to said positive end plate; and,
   g. a spring positioned between said positive current collector and said positive end plate and urging said positive current collector into said firm engagement with said positive electrode, said positive current collector being held in said firm engagement with said positive electrode solely by the force exerted on said positive current collector by said spring, whereby upon occurrence of a force sufficient to overcome the tension of said spring, said positive current collector will move out of engagement with said positive electrode, and upon cessation of said force sufficient to overcome the tension of said spring, said spring will again force said positive current collector into said firm engagement with said positive electrode.

2. The battery cell of claim 1, wherein said flexible electrical conductor member is a spring tab formed in one piece with said positive current collector and extending therefrom into contact with said positive end plate.

3. The battery cell of claim 1, wherein said positive current collector has V-projections contacting said positive electrode.

4. The battery cell of claim 3, wherein said negative current collector has V-projections contacting said negative electrode.

5. The battery cell of claim 1, wherein said positive end plate has an external surface, and wherein a positive contact member is attached to said external surface substantially at the center thereof.

6. The battery cell of claim 5, wherein said positive contact member has a disk base and an externally threaded post extending upwardly from said disk base.

7. The battery cell of claim 6, wherein said positive contact member further has a cavity in said disk base, and wherein a vent pellet is located in said cavity.

8. The battery cell of claim 7, wherein said positive end plate has a vent therein in alignment with said vent pellet, and wherein said positive contact member has a vent hole in communication with said cavity.

9. The battery cell of claim 8, wherein said flexible electrical conductor member is a spring tab having a lower end formed integrally with said positive current collector and a free upper end connected to said positive end plate, said free upper end having an orifice therethrough aligned with said vent in said positive end plate.

10. The battery cell of claim 1, wherein said case has an open upper end and an open lower end, and wherein an upper seal ring and an upper closing ring closes said open upper end, and a lower seal ring and a lower closing ring closes said open lower end.

11. The battery cell of claim 10, further including a negative end plate within said casing in contact with said negative current collector, and wherein said positive end plate has a beveled periphery and said upper seal ring has a complementary beveled portion receiving and conforming to said beveled periphery of said positive end plate, and said negative end plate also has a beveled periphery and said lower seal ring has a complementary beveled portion receiving and conforming to said beveled periphery of said negative end plate.

12. The battery cell of claim 1, wherein said spring is a coil spring.

13. The battery cell of claim 2, wherein said spring surrounds said spring tab.

14. The battery cell of claim 1, wherein said positive electrode and said negative electrode are spaced from each other by insulating separators and are spirally wound together with said insulating separators about a centrally located mandrel hole.

15. The battery cell of claim 1, wherein said cell is nickel cadmium.

16. The battery cell of claim 1, wherein said cell is nickel metal hydride.

17. The battery cell of claim 1, wherein said cell is silver metal hydride.

18. The battery cell of claim 1, wherein said cell is lithium ion.

19. The battery cell of claim 1, wherein said cell is lithium polymer.

* * * * *

UNITED STATES PATENT AND TRADEMARK OFFICE
CERTIFICATE OF CORRECTION

PATENT No. : 5,521,021

DATED : May 28, 1996

INVENTOR(S): Alexandres et al.

It is certified that error appears in the above-identified patent and that said Letters Patent is hereby corrected as shown below:

Column 5, line 8,
    delete "projections" and insert --v-projections--;

Column 5, line 13,
    delete "42 vent" and insert --42 planar portion--;

Column 5, between lines 13 and 14,
    insert --43 vent--;

Column 5, line 26,
    delete "projections" and insert --v-projections--.

Signed and Sealed this

Twenty-eighth Day of January, 1997

Attest:

BRUCE LEHMAN

Attesting Officer     Commissioner of Patents and Trademarks